US010773998B2

(12) United States Patent
Suyama et al.

(10) Patent No.: US 10,773,998 B2
(45) Date of Patent: Sep. 15, 2020

(54) METHOD OF MANUFACTURING OPTICAL FIBER WIRE

(71) Applicant: FURUKAWA ELECTRIC CO., LTD., Tokyo (JP)

(72) Inventors: Kenichi Suyama, Tokyo (JP); Yoshihiro Arashitani, Tokyo (JP); Zyunpei Watanabe, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/056,994

(22) Filed: Aug. 7, 2018

(65) Prior Publication Data
US 2018/0339941 A1    Nov. 29, 2018

Related U.S. Application Data

(63) Continuation of application No. PCT/JP2017/004939, filed on Feb. 10, 2017.

(30) Foreign Application Priority Data

Feb. 15, 2016    (JP) .................................. 2016-025456

(51) Int. Cl.
    *G02B 6/44*    (2006.01)
    *C03C 25/105*    (2018.01)
    (Continued)

(52) U.S. Cl.
    CPC .......... *C03C 25/105* (2013.01); *C03C 25/106* (2013.01); *C03C 25/1065* (2013.01);
    (Continued)

(58) Field of Classification Search
    CPC .. C03C 25/106; C03C 25/1065; C03C 25/105
    See application file for complete search history.

(56) References Cited

U.S. PATENT DOCUMENTS

| 4,923,915 A | * | 5/1990 | Urruti | ...................... | C08K 5/13 |
| | | | | | 522/97 |
| 5,636,307 A | * | 6/1997 | Cowen | ................. | G02B 6/4402 |
| | | | | | 385/102 |
| 2005/0259932 A1 | * | 11/2005 | Nagayama | ............ | C03C 13/045 |
| | | | | | 385/123 |

FOREIGN PATENT DOCUMENTS

| JP | 60-235748 | 11/1985 |
| JP | 4-243937 | 9/1992 |

(Continued)

OTHER PUBLICATIONS

International Search Report dated May 9, 2017 in PCT/JP2017/004939, filed Feb. 10, 2017 (with English Translation).

(Continued)

*Primary Examiner* — Dah-Wei D. Yuan
*Assistant Examiner* — Kristen A Dagenais-Englehart
(74) *Attorney, Agent, or Firm* — Oblon, McClelland, Maier & Neustadt, L.L.P.

(57) ABSTRACT

A method of manufacturing an optical fiber wire includes applying ultraviolet curable resin onto the outer periphery of a traveling optical fiber, cooling the ultraviolet curable resin applied to the optical fiber using first cooled inert gas, and curing the ultraviolet curable resin by radiating ultraviolet rays on the ultraviolet curable resin that is cooled by the first cooled inert gas through an ultraviolet transparent tube.

8 Claims, 6 Drawing Sheets

(51) Int. Cl.
    *C03C 25/12*         (2006.01)
    *C03C 25/1065*     (2018.01)
    *C03C 25/106*      (2018.01)
    *C03C 25/18*        (2006.01)
    *G02B 6/02*         (2006.01)

(52) U.S. Cl.
    CPC .............. *C03C 25/12* (2013.01); *C03C 25/18* (2013.01); *G02B 6/44* (2013.01); *C03B 2205/42* (2013.01); *C03C 2218/13* (2013.01); *C03C 2218/32* (2013.01); *G02B 6/02395* (2013.01)

(56) References Cited

FOREIGN PATENT DOCUMENTS

| | | |
|---|---|---|
| JP | 10-59748 | 3/1998 |
| JP | 11-130474 | 5/1999 |
| JP | 2003-212605 | 7/2003 |
| JP | 2005-162523 | 6/2005 |
| JP | 2010-117530 | 5/2010 |
| JP | 2012-254903 | 12/2012 |
| JP | 5535129 | 7/2014 |

OTHER PUBLICATIONS

Written Opinion dated May 9, 2017 in PCT/JP2017/004939, filed Feb. 10, 2017.

\* cited by examiner

METHOD OF MANUFACTURING OPTICAL FIBER WIRE

CROSS-REFERENCE TO RELATED APPLICATION(S)

This application is a continuation of International Application No. PCT/JP2017/004939, filed on Feb. 10, 2017 which claims the benefit of priority of the prior Japanese Patent Application No. 2016-025456, filed on Feb. 15, 2016, the entire contents of which are incorporated herein by reference.

BACKGROUND OF THE INVENTION

1. Field of the Invention

The present disclosure relates to a method of manufacturing an optical fiber wire.

2. Description of the Related Art

An optical fiber (which may be referred to as a glass optical fiber) made of, for example, fused silica and consisting of a core and a cladding layer usually has a coating formed on its outer peripheral surface. Such an optical fiber with its outer peripheral surface coated may be referred to as an optical fiber wire, which is discriminated from an optical fiber without coatings.

Such a method of manufacturing an optical fiber wire is used that manufactures an optical fiber by drawing a preform of the optical fiber by a drawing furnace, applies ultraviolet curable resin to the outer peripheral surface of the optical fiber using a resin application device called a die, cures the ultraviolet curable resin applied onto the outer peripheral surface of the optical fiber using an ultraviolet radiation device, thereby coating the outer peripheral surface of the optical fiber. The ultraviolet radiation device includes an ultraviolet light source emitting ultraviolet rays and an ultraviolet transparent tube for separating a device such as the ultraviolet light source from the optical fiber. Ultraviolet rays are radiated onto the optical fiber to which ultraviolet curable resin has been applied by a die through the ultraviolet transparent tube while the optical fiber is passing through the ultraviolet transparent tube.

In such an ultraviolet radiation device for manufacturing an optical fiber wire, part of constituents within the ultraviolet curable resin are likely to volatilize and adhere to the inner surface of the ultraviolet transparent tube, which makes the ultraviolet transparent tube fogged (for example, see Japanese Patent No. 5535129 and Japanese Laid-open Patent Publication No. 2005-162523). If the ultraviolet transparent tube is fogged during the manufacturing process of the optical fiber wire, insufficient amount of ultraviolet is radiated on the ultraviolet curable resin. The insufficiency causes non-uniform quality of the coating in the longitudinal direction of the optical fiber wire.

Moreover, the size of a preform of an optical fiber is increased these days, which increases a length of an optical fiber drawn from one optical fiber preform. It is thus desired that the amount of ultraviolet radiation is not decreased due to fog occurring on the ultraviolet transparent tube even in a longer-time continuous manufacturing process.

SUMMARY OF THE INVENTION

The present disclosure has been made in view of the above, and is directed to a method of manufacturing an optical fiber wire, which is capable of at least partially solving the disadvantages in the related art technology.

According to an aspect of the present disclosure, a method of manufacturing an optical fiber wire is provided. The method includes applying ultraviolet curable resin onto an outer periphery of a traveling optical fiber; cooling the ultraviolet curable resin applied to the optical fiber using first cooled inert gas; and curing the ultraviolet curable resin by radiating an ultraviolet ray on the ultraviolet curable resin that is cooled by the first cooled inert gas through an ultraviolet transparent tube.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Methods of manufacturing an optical fiber wire according to embodiments of the present disclosure will now be described in detail with reference to the accompanying drawings. It should be noted that the embodiments are not intended to limit the present disclosure. The drawings are schematically illustrated, and the relation between dimensions of elements, the ratio between elements, and the like do not necessarily coincide with the actual relation and ratios. The relation between dimensions of elements and the ratio between elements may also be different across the drawings.

Device Configuration According to the First Embodiment

Figure 1:
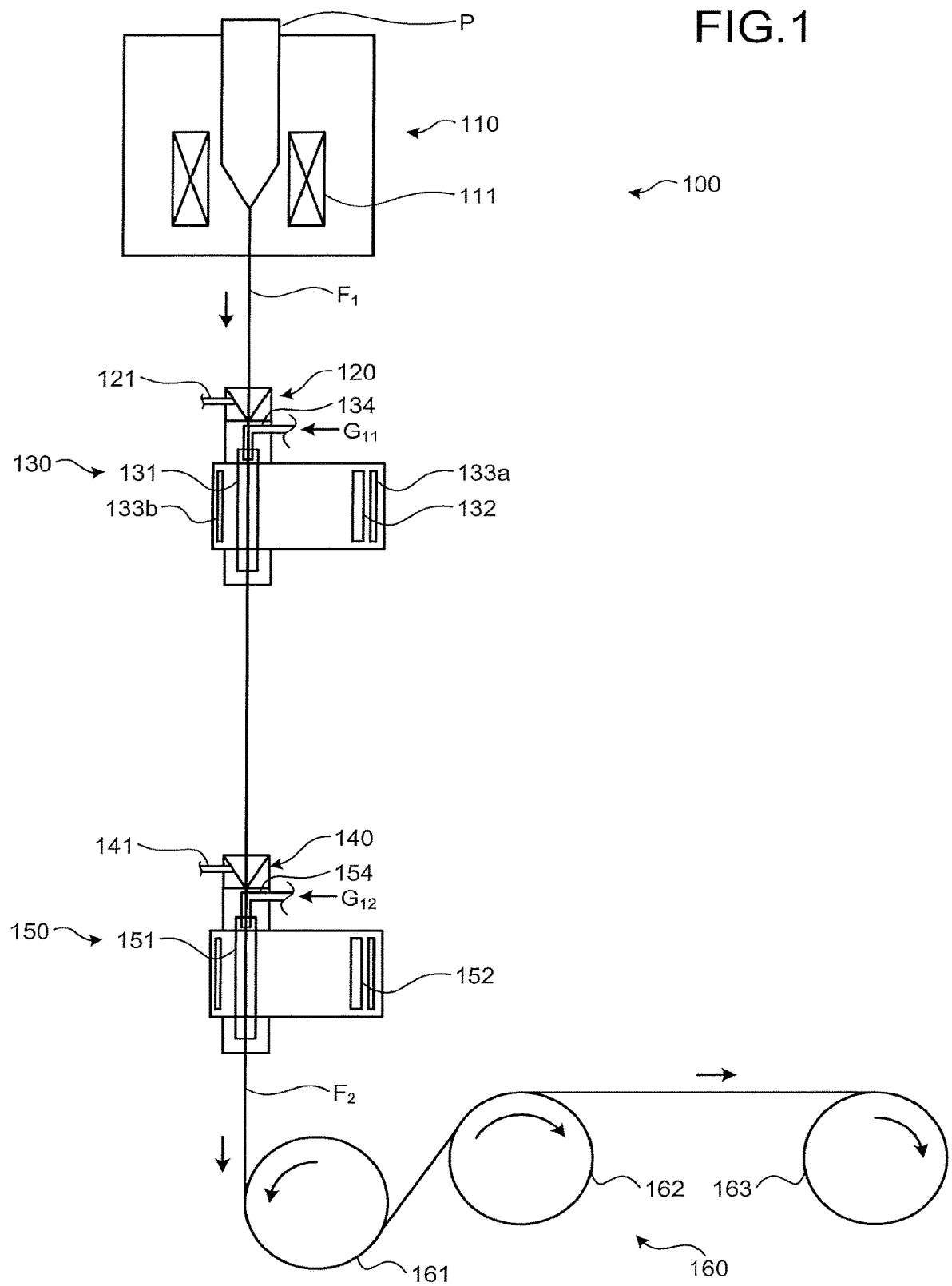
FIG. 1 illustrates a schematic configuration of a manufacturing facility of an optical fiber wire, which may preferably be used to carry out a method of manufacturing an optical fiber wire according to a first embodiment.

FIG. 1 is a drawing that illustrates a schematic configuration of a manufacturing facility of an optical fiber wire, which may preferably be used to carry out a method of manufacturing an optical fiber wire according to a first embodiment. As illustrated in FIG. 1, a manufacturing facility 100 for an optical fiber wire includes a drawing furnace 110, a primary resin application device 120, a primary ultraviolet radiation device 130, a secondary resin application device 140, a secondary ultraviolet radiation device 150, and a winder 160. The optical fiber wire manufacturing facility 100 of FIG. 1 is configured with a device group for forming an inner coating referred to as a primary layer and another device group for forming an outer coating referred to as a secondary layer. The manufacturing facility 100 has a device configuration usually employed for an optical fiber wire production of a so-called wet-on-dry method.

The drawing furnace 110 is a facility for manufacturing an optical fiber $F_1$ from an optical fiber preform P and includes a heater 111 for heating the optical fiber preform P. The optical fiber preform P is an intermediate product in which an area corresponding to cladding in the end product is formed outside an area corresponding to a core in the end product. The optical fiber $F_1$ is manufactured by stretching a lower end of the optical fiber preform P so as to have a specification outer diameter (for example, 125 μm).

The heater 111 included in the drawing furnace 110 heats the lower end of the optical fiber preform P to approximately 2000° C. The lower end of the optical fiber preform P softened by being heated by the heater 111 is stretched by the winder 160 in the subsequent stage. The outer diameter of the optical fiber $F_1$ produced by the drawing furnace 110 is adjusted using, for example, temperatures of the heater 111 and the winding speed of the winder 160.

The primary resin application device 120 and the primary ultraviolet radiation device 130 are devices for forming the primary layer of the coating on the outer peripheral surface of the optical fiber $F_1$.

The primary resin application device 120 is a device, which is generally called die, applying ultraviolet curable resin onto the outer peripheral surface of the optical fiber $F_1$. The primary resin application device 120 stores therein primary ultraviolet resin and applies ultraviolet curable resin onto the outer periphery of the optical fiber $F_1$ while a traveling optical fiber $F_1$ passes inside the primary resin application device 120. The primary resin application device 120 is provided with a primary resin feed tube 121 that feeds primary ultraviolet curable resin to the primary resin application device 120.

To sustain properties and functions of an optical fiber, such ultraviolet curable resin is used for the primary ultraviolet curable resin that has Young's modulus after curing of preferably from 0.2 Mpa to 3 Mpa inclusive, and more preferably from 0.3 MPa to 2 Mpa inclusive. There is no specific designation on the primary ultraviolet curable resin; however, such primary ultraviolet curable resin is preferable that is made by diluting (meth)acrylate oligomer having an ultraviolet curable urethane and/or epoxy skeleton as a base compound with (meth)acrylate monomer. For simple description, (meth)acrylate includes both acrylate and methacrylate.

The primary ultraviolet radiation device 130 is a device for curing ultraviolet curable resin applied onto the outer peripheral surface of the optical fiber $F_1$. The primary ultraviolet radiation device 130 includes an ultraviolet light source 132 emitting ultraviolet rays and an ultraviolet transparent tube 131 for separating the ultraviolet light source 132 from the optical fiber $F_1$. When a composition of ultraviolet curable resin volatilizes, the ultraviolet transparent tube 131 prevents the volatile composition from attaching to the ultraviolet light source 132. Ultraviolet rays emitted from the ultraviolet light source 132 are reflected on reflection mirrors 133a and 133b and radiated on the ultraviolet curable resin applied onto the outer peripheral surface of the optical fiber $F_1$ through the ultraviolet transparent tube 131. A light-emitting diode (UV-LED) having, for example, an emission wavelength of 395 nm and a D-bulb may be used for the ultraviolet light source 132. A D-bulb is one of ultraviolet light sources having a light-emitting spectrum similar to that of a metal halide lamp and strongly emits light especially in the band of 350 to 400 nm.

The primary ultraviolet radiation device 130 includes a first inert gas injecting tube 134. The first inert gas injecting tube 134 injects first inert gas $G_{11}$ into the ultraviolet transparent tube 131.

A reason to inject inert gas from the first inert gas injecting tube 134 will now be described. Generally, ultraviolet curable resin reacts with oxygen ($O_2$) and insufficiently cures under an atmosphere having high oxygen concentrations. To prevent insufficient curing, inert gas is fed from the first inert gas injecting tube 134 into the ultraviolet transparent tube 131 so that the inside of the ultraviolet transparent tube 131 can have a lower oxygen concentration. Any type of inert gas is applicable as long as the gas is inert to the optical fiber $F_1$ and ultraviolet curable resin applied to the optical fiber $F_1$; however, use of nitrogen ($N_2$) is convenient in this case.

In order to prevent contact of the ultraviolet curable resin applied onto the outer peripheral surface of the optical fiber $F_1$ with oxygen in the air, such a configuration is preferable that couples the primary resin application device 120 with the primary ultraviolet radiation device 130 and guides the optical fiber $F_1$ into the primary ultraviolet radiation device 130 from the primary resin application device 120 without having the ultraviolet curable resin contact oxygen in the air.

In addition to the above-described purpose, the first inert gas $G_{11}$ in the present embodiment is used for cooling the ultraviolet curable resin applied to the optical fiber $F_1$. Cooled inert gas instead of room-temperature inert gas is therefore used for the first inert gas $G_{11}$.

As described earlier, some compositions of ultraviolet curable resin volatilizing and attaching to the inner surface of the ultraviolet transparent tube are likely to fog the ultraviolet transparent tube. One of main factors that volatilize the compositions of the ultraviolet curable resin is the temperature of the ultraviolet curable resin. A large number of factors, such as heat of reaction generated when ultraviolet curable resin cures, heat generated with ultraviolet rays radiated on ultraviolet curable resin absorbing energy, radiant heat from the ultraviolet light source 132, and radiant heat from the ultraviolet transparent tube 131 having an increased temperature, increase the temperature of the ultraviolet curable resin and volatilize some compositions of the ultraviolet curable resin.

In the configuration according to the present embodiment, cooled inert gas is injected to the first inert gas injecting tube 134 to make an atmosphere of low-temperature inert gas in the vicinity of the optical fiber $F_1$. The ultraviolet curable resin applied onto the outer peripheral surface of the optical fiber $F_1$ traveling inside the ultraviolet transparent tube 131 is cooled by the atmosphere of low-temperature inert gas.

Although the first inert gas $G_{11}$ is effective under temperatures lower than the surface temperature of the ultraviolet curable resin, the first inert gas $G_{11}$ is preferably managed to be cooled to a temperature lower than a room temperature. The phenomenon that a composition of the ultraviolet curable resin volatilizes is a critical phenomenon having a temperature as a threshold, which will be described later with reference to the verification tests. The first inert gas $G_{11}$ is therefore preferably set at a temperature capable of decreasing the temperature of the ultraviolet curable resin to a temperature allowing a thermal weight loss of one percent. For more effective conditions, the temperature of the first inert gas $G_{11}$ is preferably set at a temperature allowing the temperature of the ultraviolet curable resin to be further decreased by 15° C. or more from the temperature allowing a thermal weight loss of one percent.

Room-temperature inert gas can be used for the first inert gas $G_{11}$ by being cooled. Instead of this manner, liquefied inert gas is vaporized to low-temperature inert gas, and the vaporized inert gas can be used by adjusting the temperature.

A reason to inject cooled first inert gas $G_{11}$ into the ultraviolet transparent tube 131 is to reduce the surface temperature of the ultraviolet curable resin. Other than this, the cooled first inert gas $G_{11}$ is effective in reducing the temperature of the ultraviolet transparent tube 131. The ultraviolet transparent tube 131 has a temperature of approximately 100° C. during operation, and the surface of the ultraviolet curable resin is heated by the high temperature. Reducing the temperature of the ultraviolet transparent tube 131 therefore contributes to a reduction in the surface temperature of the ultraviolet curable resin.

In addition, energy discharged from the ultraviolet light source 132 can efficiently reach the ultraviolet curable resin if no fog occurs on the ultraviolet transparent tube 131, which can reduce the power output of the ultraviolet light source 132. This configuration therefore reduces the power consumption and also exerts a synergistic effect of lowering the surface temperature of the ultraviolet curable resin by controlling heat generation from the ultraviolet light source 132.

The primary layer of the coating is formed on the outer peripheral surface of the optical fiber $F_1$ with the above-described device configuration of the primary resin application device 120 and the primary ultraviolet radiation device 130.

The secondary resin application device 140 and the secondary ultraviolet radiation device 150 are devices for forming a secondary layer of the coating on the outer peripheral surface of the optical fiber $F_1$ on which the primary layer has been formed. The secondary resin application device 140 and the secondary ultraviolet radiation device 150 have substantially the same configurations as those of the primary resin application device 120 and the primary ultraviolet radiation device 130, respectively, and description of the same configuration will therefore be omitted as appropriate.

The secondary resin application device 140 is a device for applying ultraviolet curable resin onto the outer peripheral surface of the optical fiber $F_1$ on which the primary layer has been formed. The secondary resin application device 140 stores therein secondary ultraviolet resin and applies ultraviolet curable resin over the primary layer formed on the optical fiber $F_1$ while the traveling optical fiber $F_1$ passes inside the secondary resin application device 140. The secondary resin application device 140 is provided with a secondary resin feed tube 141 that feeds secondary ultraviolet curable resin to the secondary resin application device 140.

To sustain properties and functions of an optical fiber, such ultraviolet curable resin is used for the secondary ultraviolet curable resin that has Young's modulus after curing higher than that of the primary ultraviolet curable resin, for example, Young's modulus after curing of 500 MPa to 2000 MPa. The primary ultraviolet curable resin is made of a soft material so as not to apply unnecessary stress to the optical fiber, whereas the secondary ultraviolet curable resin is made of a hard material so as not to transmit external stress to the optical fiber.

The secondary ultraviolet radiation device 150 is a device for curing secondary ultraviolet curable resin applied over the primary layer formed on the optical fiber $F_1$. The secondary ultraviolet radiation device 150 includes an ultraviolet light source 152 emitting ultraviolet rays and an ultraviolet transparent tube 151 for separating the ultraviolet light source 152 from the optical fiber $F_1$. The secondary ultraviolet radiation device 150 further includes a first inert gas injecting tube 154. The first inert gas injecting tube 154 injects second inert gas $G_{12}$ into the ultraviolet transparent tube 151.

A reason to inject inert gas from the first inert gas injecting tube 154 is to reduce the oxygen concentrations inside the ultraviolet transparent tube 151 and inside the secondary ultraviolet radiation device 150. Any type of inert gas is applicable as long as the gas is inert to the optical fiber $F_1$ and ultraviolet curable resin applied to the optical fiber $F_1$; however, use of nitrogen ($N_2$) is convenient in this case.

Room-temperature inert gas can be used for the second inert gas $G_{12}$, and cooled inert gas is also applicable. As described earlier, such ultraviolet curable resin is used for the secondary ultraviolet curable resin that has Young's modulus after curing higher than that of the primary ultraviolet curable resin. As indicated by the later-described verification tests, compositions of ultraviolet curable resin having higher Young's modulus after curing are generally less likely to volatilize. Moreover, the secondary ultraviolet curable resin has a property of being prevented from curing at lower temperatures. Room-temperature inert gas is therefore preferably used for the second inert gas $G_{12}$ although cooled inert gas is still applicable depending on the type of the secondary ultraviolet curable resin.

With the above-described device configuration with the secondary resin application device 140 and the secondary ultraviolet radiation device 150, a secondary layer is formed on the primary layer formed on the outer peripheral surface of the optical fiber $F_1$, and the optical fiber wire $F_2$ is manufactured.

The winder 160 includes guide rollers 161 and 162 and a winding drum 163 and winds the manufactured optical fiber wire $F_2$. The winder 160 is capable of adjusting the speed (generally called linear speed) at which the optical fiber $F_1$ passes the primary ultraviolet radiation device 130 and others by adjusting the speed for winding the optical fiber wire $F_2$. For example, the linear speed is preferably equal to or larger than 850 m/min. This configuration ensures formation of an accompanying airflow from cooled inert gas in the vicinity of the primary, which can effectively control volatilization of compositions of the ultraviolet curable resin. This configuration can also prevent insufficient curing of coating caused due to oxygen.

Method of Manufacturing According to the First Embodiment

Figure 2:
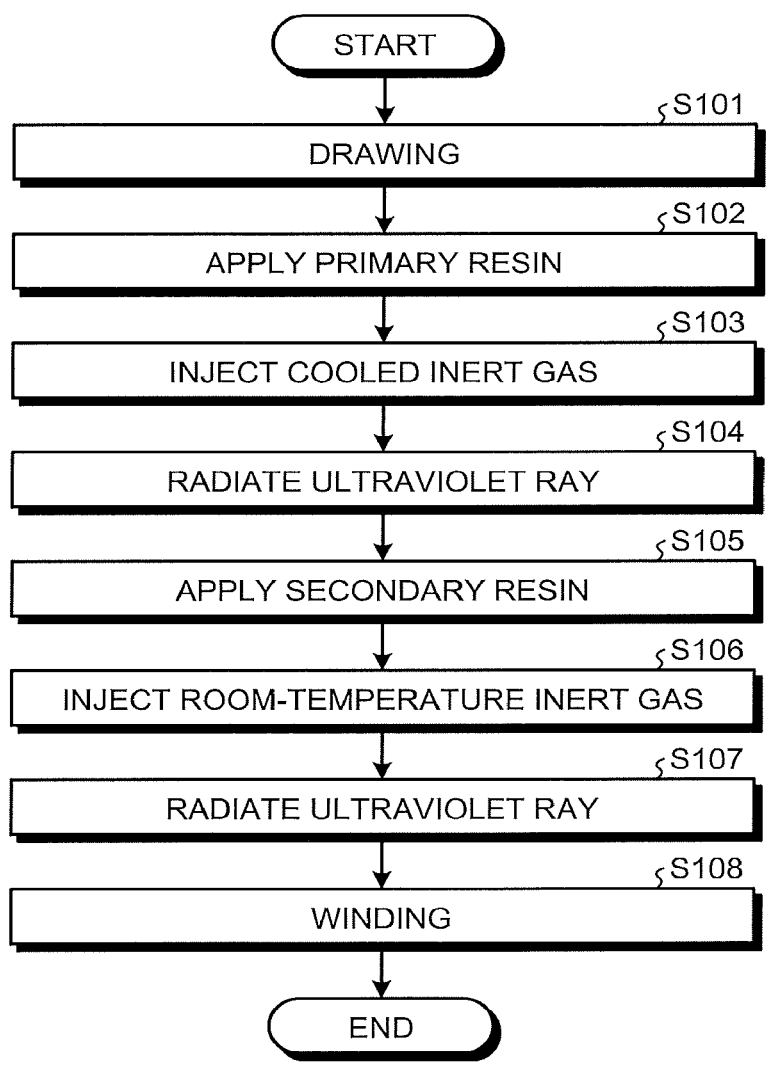
FIG. 2 is a flowchart that schematically illustrates the method of manufacturing an optical fiber wire according to the first embodiment.

A method of manufacturing an optical fiber wire according to the first embodiment using the above-described device configuration will now be described with reference to FIG. 2. FIG. 2 is a flowchart that schematically illustrates the method of manufacturing an optical fiber wire according to the first embodiment. The flowchart in FIG. 2 merely illustrates a general process flow in the method of manufacturing an optical fiber wire, and the summary of the disclosure does not necessarily suggest all the steps be executed. In addition, based on the manufacturing characteristics, the method of manufacturing an optical fiber wire is implemented with the steps of the flowchart performed as a continuous flow. In the method, all the steps are therefore performed without being separated or simultaneously performed.

The method of manufacturing an optical fiber wire illustrated in FIG. 2 begins with drawing the optical fiber preform P by the drawing furnace 110 (Step S101). Drawing is a process of heating the optical fiber preform P and producing an optical fiber $F_1$ from the optical fiber preform P.

Primary ultraviolet curable resin is applied onto the outer peripheral surface of the optical fiber $F_1$ using the primary resin application device 120 (Step S102).

The primary ultraviolet curable resin applied to the optical fiber $F_1$ is cooled by the first inert gas $G_{11}$. This step of cooling is performed by injecting cooled first inert gas $G_{11}$ into the ultraviolet transparent tube 131 of the primary ultraviolet radiation device 130 (Step S103). This step prevents contact of the primary ultraviolet curable resin applied to the optical fiber $F_1$ with oxygen and prevents compositions of the primary ultraviolet curable resin from volatilizing.

In this manner, the primary ultraviolet curable resin that is cooled by the first inert gas $G_{11}$ starts curing with the ultraviolet light source 132 radiating ultraviolet rays on the primary ultraviolet curable resin through the ultraviolet transparent tube 131 (Step S104). With this, the primary layer of the coating is formed on the outer peripheral surface of the optical fiber $F_1$.

The secondary ultraviolet curable resin is thereafter applied over the primary layer formed on the optical fiber $F_1$ using the secondary resin application device 140 (Step S105).

In the secondary ultraviolet radiation device 150, room-temperature second inert gas $G_{12}$ is injected into the ultraviolet transparent tube 151 (Step S106). This is because a composition of ultraviolet curable resin having higher Young's modulus after curing is generally less likely to volatilize, and also because the secondary ultraviolet curable resin tends to be prevented from curing at low cure temperatures.

In the secondary ultraviolet radiation device 150, ultraviolet rays radiated from the ultraviolet light source 152 through the ultraviolet transparent tube 151 cure the secondary ultraviolet curable resin (Step S107). With this, the secondary layer is formed over the primary layer formed on the outer peripheral surface of the optical fiber $F_1$, and an optical fiber wire $F_2$ is manufactured.

The optical fiber wire $F_2$ is wound onto the winding drum 163 by the winder 160 (Step S108).

Device Configuration According to the Second Embodiment

Figure 3:
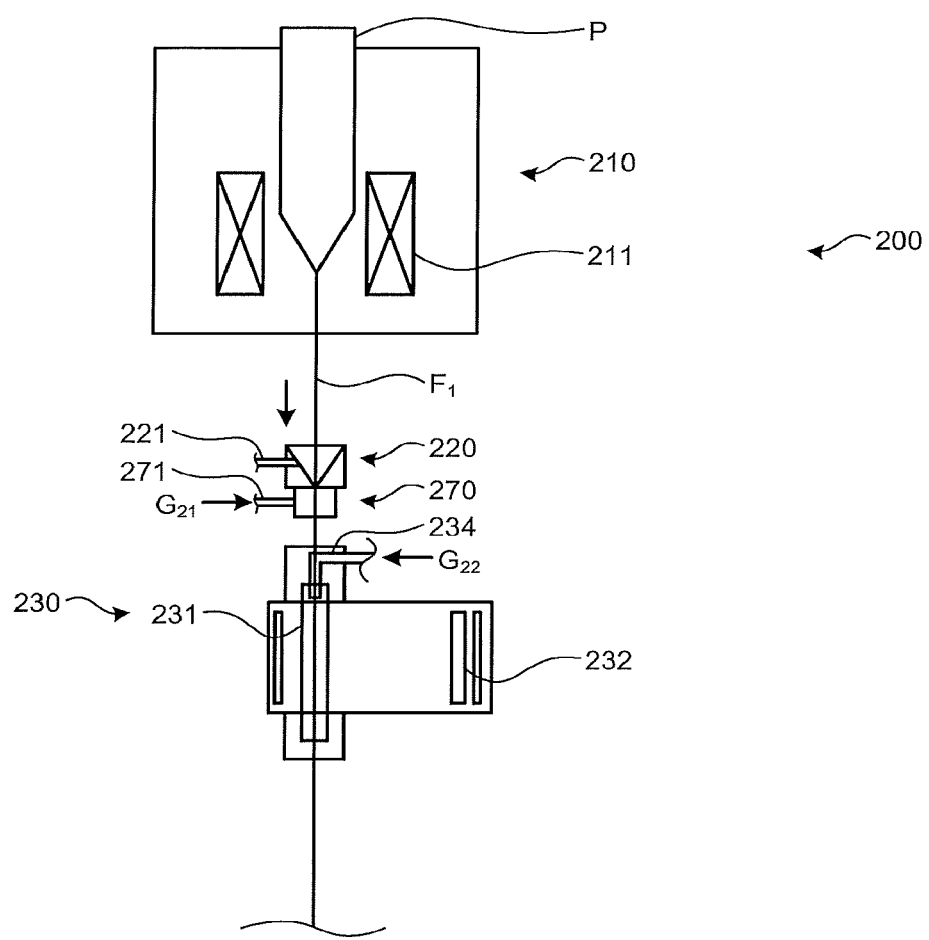
FIG. 3 is a drawing that illustrates a schematic configuration of a manufacturing facility of an optical fiber wire, which may preferably be used to carry out a method of manufacturing an optical fiber wire according to a second embodiment.

FIG. 3 is a drawing that illustrates a schematic configuration of a manufacturing facility of an optical fiber wire used by a method of manufacturing an optical fiber wire according to a second embodiment. As illustrated in FIG. 3, a manufacturing facility 200 for an optical fiber wire includes a drawing furnace 210, a primary resin application device 220, a primary accompanying-airflow formation device 270, and a primary ultraviolet radiation device 230. The manufacturing facility 200 for an optical fiber wire illustrated in FIG. 3 has a device configuration with some additional devices to the manufacturing facility 100 for an optical fiber wire. Description about a device for forming the secondary layer will therefore be omitted. The device configuration omitted in the second embodiment should be considered to be the same as that of the first embodiment.

The drawing furnace 210 is a facility for producing an optical fiber $F_1$ from an optical fiber preform P and includes a heater 211 for heating the optical fiber preform P. The configuration and the function of the drawing furnace 210 are the same as those in the device configuration according to the first embodiment.

The primary resin application device 220, the primary accompanying-airflow formation device 270, and the primary ultraviolet radiation device 230 are devices for forming a primary layer of the coating on the outer peripheral surface of the optical fiber $F_1$.

The primary resin application device 220 is a device for applying ultraviolet curable resin onto the outer peripheral surface of the optical fiber $F_1$ and is provided with a primary resin feed tube 221 that feeds primary ultraviolet curable resin to the primary resin application device 220. The same primary ultraviolet curable resin used by the device configuration according to the first embodiment can be used.

The primary accompanying-airflow formation device 270 is disposed immediately downstream in relation to the primary resin application device 220 along a travelling direction of the optical fiber $F_1$ and forms an accompanying airflow of inert gas in the vicinity of the surface of the primary ultraviolet curable resin.

An air layer that accompanies the traveling optical fiber $F_1$ while involving the surrounding air is formed in the vicinity of the surface of the traveling optical fiber $F_1$, and the air layer is called accompanying airflow. As described earlier, the ultraviolet curable resin has a property of insufficiently curing when reacting with oxygen. If the accompanying airflow formed after application of the primary ultraviolet curable resin is air with high oxygen concentrations, the primary ultraviolet curable resin reacts with oxygen and insufficiently cures. The primary accompanying-airflow formation device 270 thus forms an accompanying airflow of inert gas in the vicinity of the surface of the primary ultraviolet curable resin and prevents the primary ultraviolet curable resin from contacting oxygen.

In addition, in the present embodiment, the primary accompanying-airflow formation device 270 has a function of cooling the primary ultraviolet curable resin applied to the optical fiber $F_1$. The primary accompanying-airflow formation device 270 includes a first inert gas injecting tube 271 that injects first inert gas $G_{21}$ for forming an accompanying airflow and cools the first inert gas $G_{21}$ injected to the first inert gas injecting tube 271.

An atmosphere of the cooled first inert gas $G_{21}$ is formed inside the primary accompanying-airflow formation device 270, and the optical fiber $F_1$ travels in the atmosphere of the first inert gas $G_{21}$. The cooled first inert gas $G_{21}$ turns to an accompanying airflow in the vicinity of the surface of the primary ultraviolet curable resin. The cooled accompanying airflow directly and continuously contacts the primary ultraviolet curable resin, thereby effectively cooling the primary ultraviolet curable resin.

The primary ultraviolet radiation device 230 is a device for curing ultraviolet curable resin applied onto the outer peripheral surface of the optical fiber $F_1$ and includes an ultraviolet light source 232 emitting ultraviolet rays, an ultraviolet transparent tube 231, and a second inert gas injecting tube 234. The primary ultraviolet radiation device 230 therefore has the same configuration as that of the first embodiment.

Cooled second inert gas $G_{22}$ is preferably injected into the second inert gas injecting tube 234 for injecting gas into the ultraviolet transparent tube 231. The cooled second inert gas $G_{22}$ can avoid an increase in the temperature of the primary ultraviolet curable resin that is caused due to heat generation, heat absorption, and other factors inside the ultraviolet transparent tube 231.

The primary layer of the coating is formed on the outer peripheral surface of the optical fiber $F_1$ with the above-described device configuration including the primary resin application device 220, the primary accompanying-airflow formation device 270, and the primary ultraviolet radiation device 230. A secondary layer is thereafter formed over the primary layer formed on the outer peripheral surface of the optical fiber $F_1$ using the same device configuration as that of the first embodiment, and an optical fiber wire $F_2$ is manufactured.

Method of Manufacturing According to the Second Embodiment

Figure 4:
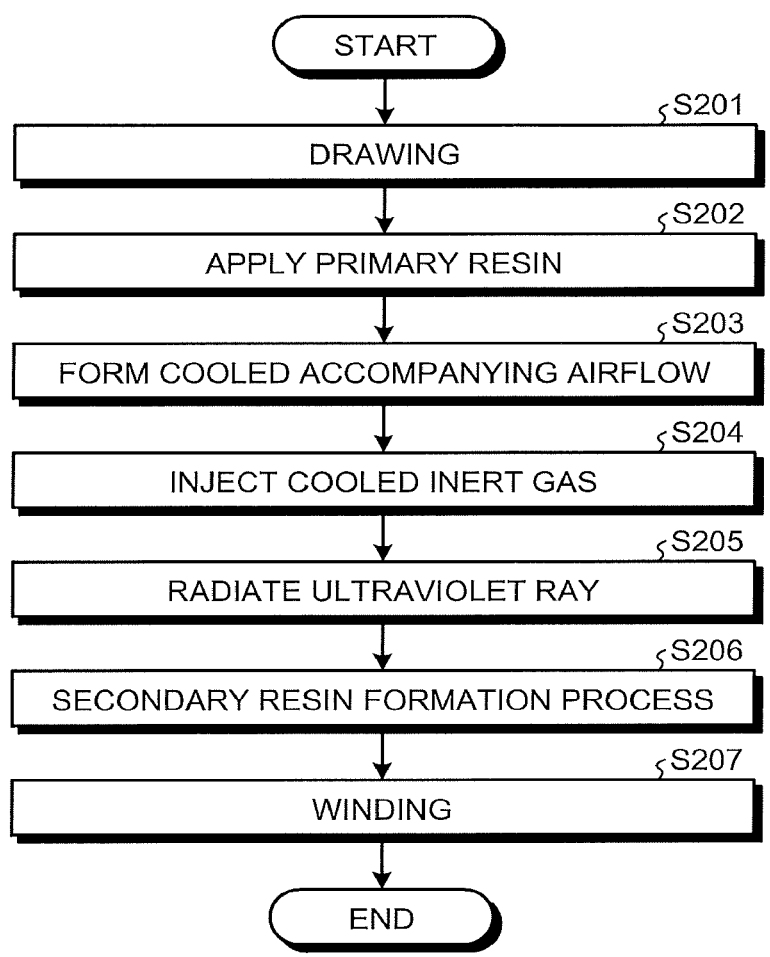
FIG. 4 is a flowchart that schematically illustrates the method of manufacturing an optical fiber wire according to the second embodiment.

A method of manufacturing an optical fiber wire according to the second embodiment using the above-described device configuration will now be described with reference to FIG. 4. FIG. 4 is a flowchart that schematically illustrates the method of manufacturing an optical fiber wire according to the second embodiment. The flowchart in FIG. 4 merely illustrates a general process flow in the method of manufacturing an optical fiber wire, and the summary of the disclosure does not necessarily suggest all the steps be executed. In addition, based on the manufacturing characteristics, the method of manufacturing an optical fiber wire is implemented with the steps of the flowchart performed as a continuous flow. In the method, all the steps are therefore performed without being separated or simultaneously performed.

The method of manufacturing an optical fiber wire illustrated in FIG. 4 begins with drawing the optical fiber preform P by the drawing furnace 210 (Step S201). Drawing is a process of heating the optical fiber preform P and producing an optical fiber $F_1$ from the optical fiber preform P.

Primary ultraviolet curable resin is applied onto the outer peripheral surface of the optical fiber $F_1$ using the primary resin application device 220 (Step S202).

The primary ultraviolet curable resin applied to the optical fiber $F_1$ is cooled by the first inert gas $G_{21}$. This step of cooling is performed by forming an accompanying airflow of the cooled first inert gas $G_{21}$ in the vicinity of the surface of the primary ultraviolet curable resin (Step S203). The accompanying airflow is formed with the optical fiber $F_1$ traveling in the atmosphere of the first inert gas $G_{21}$. The accompanying airflow of the cooled first inert gas $G_{21}$ directly and continuously contacts the primary ultraviolet curable resin, thereby effectively cooling the primary ultraviolet curable resin.

For more effective cooling, cooled second inert gas $G_{22}$ is injected into the ultraviolet transparent tube 231 of the primary ultraviolet radiation device 230 (Step S204). This process can avoid an increase in the temperature of the primary ultraviolet curable resin that is caused due to heat generation, heat absorption, and other factors inside the ultraviolet transparent tube 231. This process can therefore further prevent volatilization of a composition of the primary ultraviolet curable resin.

In this manner, the primary ultraviolet curable resin that is cooled by the first inert gas $G_{21}$ starts curing with the ultraviolet light source 232 radiating ultraviolet rays on the primary ultraviolet curable resin through the ultraviolet transparent tube 231 (Step S205). With this, the primary layer of the coating is formed on the outer peripheral surface of the optical fiber $F_1$.

The secondary layer is formed over the primary layer formed on the outer peripheral surface of the optical fiber $F_1$ using the same device configuration and the method of manufacturing as those of the first embodiment, whereby the optical fiber wire $F_2$ is manufactured (Step S206). Steps S105 to S107 in the first embodiment illustrated in FIG. 2 are collectively described as a secondary resin formation process (Step S206) in FIG. 4.

At the last step, the optical fiber wire $F_2$ is wound onto a winding drum by a winder (Step S207).

Device Configuration According to the Third Embodiment

Figure 5:
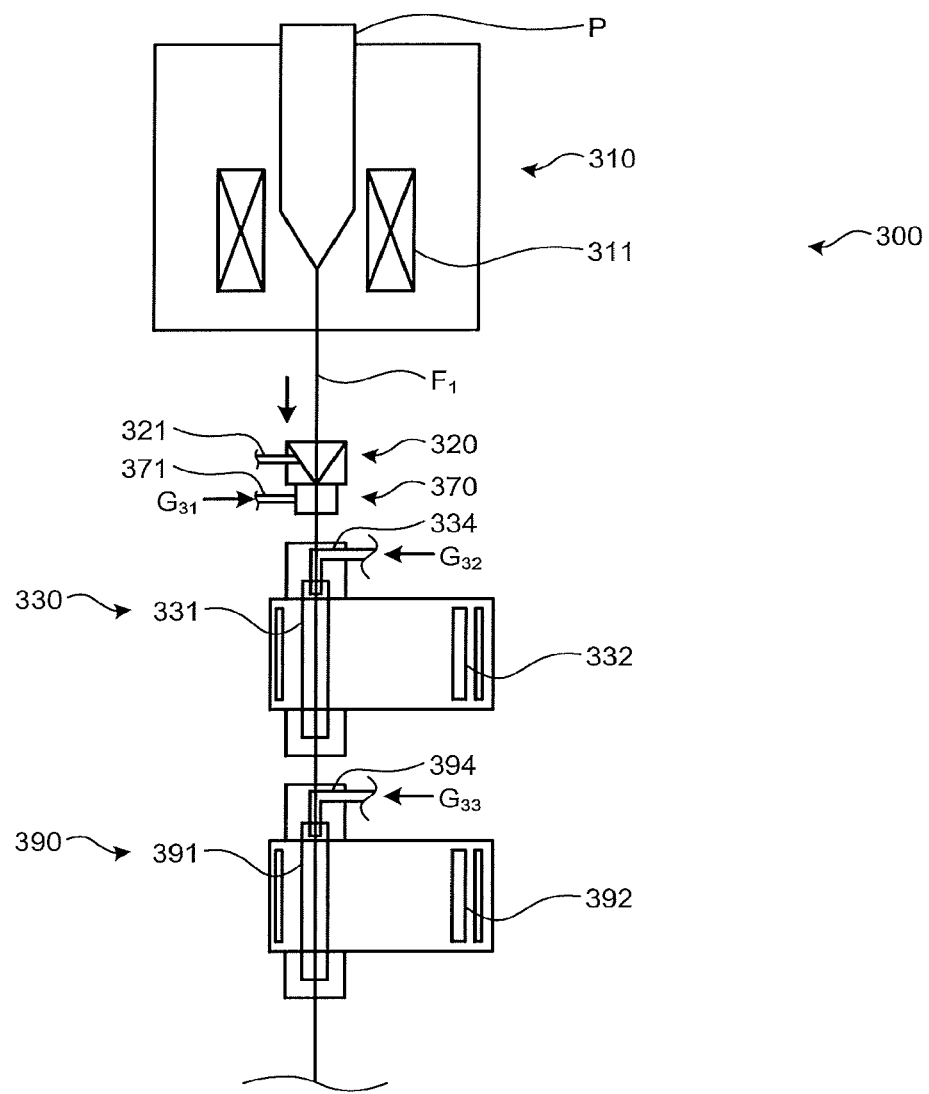
FIG. 5 is a drawing that illustrates a schematic configuration of a manufacturing facility of an optical fiber wire, which may preferably be used to carry out a method of manufacturing an optical fiber wire according to a third embodiment.

FIG. 5 is a drawing that illustrates a schematic configuration of a manufacturing facility of an optical fiber wire used by a method of manufacturing an optical fiber wire according to a third embodiment. As illustrated in FIG. 5, a manufacturing facility 300 for an optical fiber wire includes a drawing furnace 310, a primary resin application device 320, a primary accompanying-airflow formation device 370, a first primary ultraviolet radiation device 330, and a second primary ultraviolet radiation device 390. The primary accompanying-airflow formation device 370 is provided with a first inert gas injecting tube 371 to which first inert gas $G_{31}$ is injected, similarly to the configuration of the manufacturing facility according to the second embodiment. The manufacturing facility 300 for an optical fiber wire illustrated in FIG. 5 has a device configuration with some additional devices to the manufacturing facility 200 for an optical fiber wire. Description about the device for forming the secondary layer will therefore be omitted. The device configuration omitted in the third embodiment should be considered to be the same as that of the first embodiment or of the second embodiment.

The drawing furnace 310 is a facility for producing an optical fiber $F_1$ from an optical fiber preform P and includes a heater 311 for heating the optical fiber preform P. The primary resin application device 320 is a device for applying ultraviolet curable resin onto the outer peripheral surface of the optical fiber $F_1$ and is provided with a primary resin feed tube 321 that feeds primary ultraviolet curable resin to the primary resin application device 320. The primary accompanying-airflow formation device 370 is disposed immediately downstream in relation to the primary resin application device 320 along a travelling direction of the optical fiber $F_1$ and forms an accompanying airflow of inert gas in the vicinity of the surface of the primary ultraviolet curable resin. The configurations and the functions of the drawing furnace 310, the primary resin application device 320, and the primary accompanying-airflow formation device 370 are the same as those in the device configuration of the first embodiment or the second embodiment.

As illustrated in FIG. 5, the manufacturing facility 300 for an optical fiber wire includes the first primary ultraviolet radiation device 330 and the second primary ultraviolet radiation device 390. Use of one ultraviolet radiation device may insufficiently cure the ultraviolet curable resin. A plurality of ultraviolet radiation devices are therefore equipped for securing a sufficient amount of ultraviolet radiation. In the example of FIG. 5, two ultraviolet radiation devices are illustrated; however, description about the configuration according to the present embodiment is widely applicable to a manufacturing facility for an optical fiber wire having a plurality of ultraviolet radiation devices without departing from the summary of the disclosure.

The first primary ultraviolet radiation device 330 is a device for curing ultraviolet curable resin applied onto the outer peripheral surface of the optical fiber $F_1$ and includes an ultraviolet light source 332 emitting ultraviolet rays, an ultraviolet transparent tube 331, and a second inert gas injecting tube 334. Likewise, the second primary ultraviolet radiation device 390 is a device for curing ultraviolet curable resin applied onto the outer peripheral surface of the optical fiber $F_1$ and includes an ultraviolet light source 392 emitting ultraviolet rays, an ultraviolet transparent tube 391, and a third inert gas injecting tube 394. The first primary ultraviolet radiation device 330 and the second primary ultraviolet radiation device 390 have the same device configurations.

However, the first primary ultraviolet radiation device 330 and the second primary ultraviolet radiation device 390 have respective different desirable temperatures of inert gas.

With regards to the first primary ultraviolet radiation device 330, cooled second inert gas $G_{32}$ is preferably injected into the second inert gas injecting tube 334 for injecting gas into the ultraviolet transparent tube 331, which is to avoid an increase in the temperature of the primary ultraviolet curable resin that is caused due to heat generation, heat absorption, and other factors inside the ultraviolet transparent tube 331.

With regards to the second primary ultraviolet radiation device 390, room-temperature third inert gas $G_{33}$ is preferably injected into the ultraviolet transparent tube 391.

In this manner, the first primary ultraviolet radiation device 330 and the second primary ultraviolet radiation device 390 have respective different desirable temperatures of inert gas. As a reason for the difference, the amount of volatilization of compositions is quite small once the surface of the ultraviolet curable resin cures; however, if the process proceeds to subsequent stages with the surface of the ultraviolet curable resin kept at low temperatures, formation of a secondary resin layer is obstructed.

A primary layer of the coating is formed on the outer peripheral surface of the optical fiber $F_1$ using the above-described device configuration of the primary resin application device 320, the primary accompanying-airflow formation device 370, the first primary ultraviolet radiation device 330, and the second primary ultraviolet radiation device 390. A secondary layer is thereafter formed over the primary layer formed on the outer peripheral surface of the optical fiber $F_1$ using the same device configuration as that of the first embodiment or the second embodiment, and an optical fiber wire $F_2$ is manufactured.

Device Configuration According to the Fourth Embodiment

Figure 6:
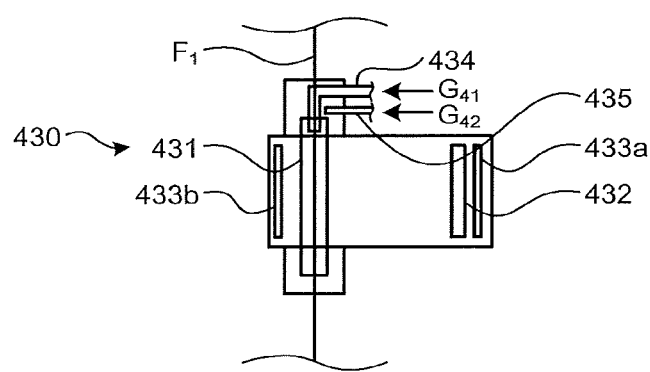
FIG. 6 is a drawing that illustrates a schematic configuration of a manufacturing facility of an optical fiber wire, which may preferably be used to carry out a method of manufacturing an optical fiber wire according to a fourth embodiment.

FIG. 6 is a drawing that illustrates a schematic configuration of a manufacturing facility of an optical fiber wire used by a method of manufacturing an optical fiber wire according to a fourth embodiment. The manufacturing facility of an optical fiber wire used by the method of manufacturing an optical fiber wire according to the fourth embodiment is configured by replacing the ultraviolet radiation devices in the device configurations according to the first embodiment to the third embodiment with another different ultraviolet radiation device. FIG. 6 therefore illustrates only the configuration of the replacing ultraviolet radiation device. The device configuration omitted in the fourth embodiment should be considered to be the same as those of the first embodiment to the third embodiment.

A primary ultraviolet radiation device 430 illustrated in FIG. 6 is a device for curing ultraviolet curable resin applied onto the outer peripheral surface of the optical fiber $F_1$. The primary ultraviolet radiation device 430 includes an ultraviolet light source 432 emitting ultraviolet rays and an ultraviolet transparent tube 431 for separating the ultraviolet light source 432 from the optical fiber $F_1$. Ultraviolet rays emitted from the ultraviolet light source 432 are reflected on reflection mirrors 433a and 433b and radiated on ultraviolet curable resin applied onto the outer peripheral surface of the optical fiber $F_1$ through the ultraviolet transparent tube 431.

The primary ultraviolet radiation device 430 includes a first inert gas injecting tube 434 and a second inert gas injecting tube 435. The first inert gas injecting tube 434 injects first inert gas $G_{41}$ into the ultraviolet transparent tube 431. The second inert gas injecting tube 435 has an injecting port in an area that is inside the primary ultraviolet radiation device 430 and is distanced from the optical fiber $F_1$ compared to an injecting port of the first inert gas $G_{41}$. Second inert gas $G_{42}$ is therefore injected to an area distanced from the optical fiber $F_1$ compared to the area to which the first inert gas $G_{41}$ is injected. Reducing the oxygen concentration in the vicinity of the optical fiber $F_1$ is sufficiently effective; however, in the present embodiment, the second inert gas $G_{42}$ is injected to make an atmosphere of low oxygen concentration even in the outer area. This configuration can enhance the advantageous effects.

In this configuration, cooled inert gas is preferably used for the first inert gas $G_{41}$, and room-temperature inert gas is preferably used for the second inert gas $G_{42}$ although cooled inert gas is also applicable. As a reason for this, the amount of volatilization of the compositions is quite small once the surface of the ultraviolet curable resin cures; however, if the process proceeds to subsequent stages with the surface of the ultraviolet curable resin kept at low temperatures, formation of a secondary resin layer is obstructed.

An embodiment exerting advantageous effects of the present disclosure can be implemented even with the above-described primary ultraviolet radiation device 430 replaced by any one of the ultraviolet radiation devices employed in the device configurations according to the first to the third embodiments.

Disclosure of Verification Tests

Results of tests for verifying effectiveness of the methods of manufacturing an optical fiber wire according to the embodiments of the present disclosure will now be described.

An ultraviolet curable resin used in the verification tests will now be described. A resin A and a resin B were used for the verification tests. The resin A and the resin B are urethane (meth)acrylate-based ultraviolet curable resin. More specifically, the resin was prepared by adding a photopolymerization initiator to a chemical compound made by diluting urethane (meth)acrylate oligomer as a base compound with mono-functional and/or bifunctional (meth)acrylate monomer.

The thermogravimetric analysis (TGA) was conducted to evaluate the properties of the resin A and the resin B. TGA is a test for observing the mass of a test sample piece, on which a controlled temperature program is conducted in a controlled atmosphere, as a function of temperature. TGA allows observation and quantification of volatilization of a composition having a low boiling point. In this test, the weight for temperatures (in percentage) is plotted with the temperature of the sample gradually increased. TG/DTA 6200 of Seiko Instruments Inc. was used for the TGA.

Temperatures for a one-percent weight loss were measured as follows. First, 10 mg of the resin A and 10 mg of the resin B were placed on aluminum sample pans, respectively. Then, while increasing a temperature of each of the resins A and B from a room temperature to 100° C. at a rate of 10° C./min in an environment with airflow, a temperature was measured when a weight of each resin was decreased to 99% with respect to a weight of each resin at room temperature as 100%. The measured temperature is defined as a one-percent thermal weight loss temperature.

Figure 7:
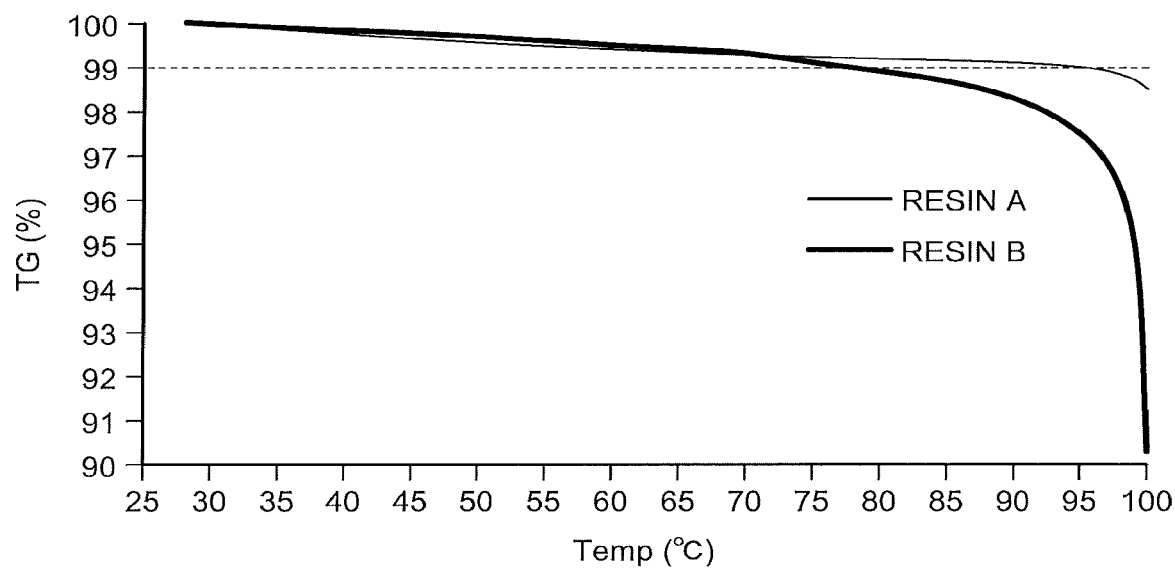
FIG. 7 is a graph that illustrates results of an thermogravimetric analysis.

FIG. 7 is a graph indicating results of TGA and illustrating a weight loss rate (TG) and a temperature relation between (Temp). Table 1 is a list of results of TGA. As illustrated in FIG. 7 and Table 1, the resin A has a one-percent thermal weight loss temperature of 93° C., whereas the resin B has that of 75° C. The elastic modulus after curing is added to Table 1. From the relation between the elastic modulus after curing and the one-percent thermal weight loss temperature, such a trend is identified in Table 1 that the one-percent thermal weight loss temperature is lower for lower elastic modulus after curing.

TABLE 1

|  | Elastic modulus after curing | One-percent thermal weight loss temperature |
|---|---|---|
| Resin A | 1.0 MPa | 93° C. |
| Resin B | 0.8 MPa | 75° C. |

Figure 8:
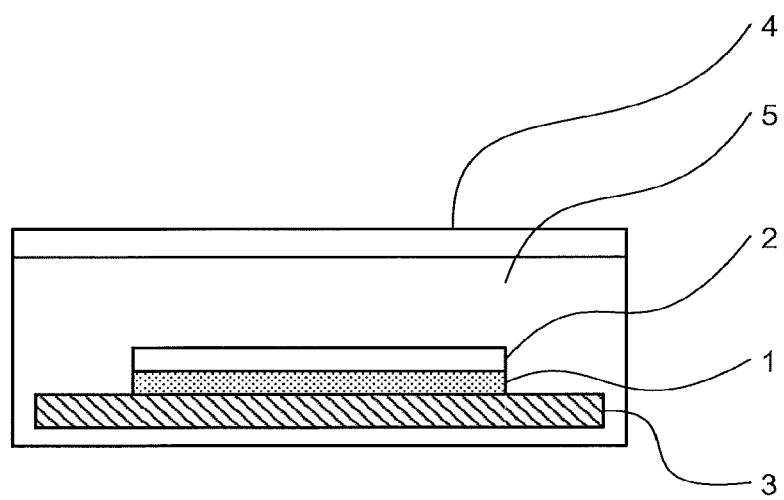
FIG. 8 is a drawing that illustrates a setup used for a test of the occurrence of fog.

Tests for identifying the occurrence of fog were conducted on the resin A and the resin B. FIG. 8 is a drawing that illustrates a setup used for the tests for identifying the occurrence of fog. Resin 2, which is either the resin A or the resin B, is spin coated on a blue glass board 1 so as to have a thickness of 50 μm. The blue glass board 1 with the resin 2 is placed on a hot plate 3 having a certain temperature. The hot plate 3 having the blue glass board 1 placed thereon is put in a purge box 5 having its upper portion tightly closed by a fused silica plate 4. In this state, a time until fog occurs on the fused silica plate 4 was measured. Table 2 indicates temperatures of the hot plate 3 and respective times until fog occurs on the fused silica glass 4. In Table 2, ">five minutes" means that no fog has occurred after observation for over five minutes.

TABLE 2

| Temperature of hot plate |  | 40° C. | 60° C. | 80° C. | 100° C. | 120° C. |
|---|---|---|---|---|---|---|
| Time until fog Occurs | Resin A | >5 min | >5 min | >5 min | 2.5 min | 1.0 min |
|  | Resin B | >5 min | 1.5 min | 50 sec | 20 sec | Not conducted |

As illustrated in Table 2, the phenomenon of volatilization of a composition of ultraviolet curable resin critically differs above or below a certain temperature as a threshold. Specifically, the resin A has a threshold between 80° C. and 100° C., and no compositions substantially volatilizes at temperatures under the threshold. The resin B has a threshold between 40° C. and 60° C., and no compositions substantially volatilizes at temperatures under the threshold. The temperature at which the composition starts volatilizing is close to an earlier-measured one-percent thermal weight loss temperature.

As findings from these tests, in the method of manufacturing an optical fiber wire in the above-described embodiments, inert gas is preferably set to a temperature allowing a reduction in the temperature of ultraviolet curable resin to the one-percent thermal weight loss temperature, and further preferably, set to a temperature allowing a reduction in the temperature of the ultraviolet curable resin to a temperature lower than the one-percent thermal weight loss temperature by 15° C. or more.

Evaluation tests of an optical fiber wire were conducted. The evaluation items are the ratio between reaction rates and a pull-out force.

The reaction rate of a primary layer is calculated in the following manner. First, the primary layer of an optical fiber is exposed by removing the secondary layer of the optical fiber wire. An IR spectrum is measured for the primary layer in accordance with an attenuated total reflection (ATR) method using a Fourier transform infrared spectrometer (FT-IR). An area of absorption from 800 cm$^{-1}$ to 815 cm$^{-1}$ derived from the acryloyl group is calculated, using an area of absorption from 1510 cm$^{-1}$ to 1530 cm$^{-1}$ derived from the NH group as a reference. Then, a difference between the areas before and after the curing of the primary layer is calculated as a change rate (a reduction rate). The reaction rate becomes 100% when absorption derived from the acryloyl group completely disappears.

The ratio between the reaction rates is calculated by sampling optical fiber wires at positions of 50 km and 1000 km from a leading end of the optical fiber, from which the preform is drawn, and calculating the ratio (ratio of 1000 km to 50 km) between measured values of the reaction rates at the respective positions. The ratio closer to 1 represents more stable production with no reductions in curability over a long time.

A method of measuring the pull-out force will now be described. A coating portion is removed in order for the optical fiber to be exposed, from an end of an optical fiber wire with a length of one centimeter of the coating portion remained. The outer periphery of the remaining coating portion is fixed to a support jig by using an adhesive agent or the like. Then, the optical fiber (glass portion) is pulled at a speed of 5 mm/min in such a manner that the optical fiber is pulled out from the remaining coating portion of one-centimeter-long. The pulling force when the optical fiber begins sliding with respect to the remaining coating portion is measured as the pull-out force.

The optical fiber wire preferably has a pull-out force of equal to or greater than 4 N, more preferably, from 4 N to 15 N, and quite preferably, from 5 N to 10 N. The coating of the optical fiber cannot be completely removed with a too-large pull-out force, and resin remains on the glass surface of the optical fiber. On the other hand, detachment is undesirably caused at the interface between the glass and the primary layer with a too-small pull-out force.

For the evaluation tests, comparison is made between the first and the second comparative examples and the first to the third examples. Detailed test conditions and the test results are indicated on Table 3.

TABLE 3

|  | First comparative example | Second comparative example | First example | Second example | Third example |
|---|---|---|---|---|---|
| Linear speed (m/min) | 1,000 | 1,000 | 1,000 | 1,000 | 1,000 |
| Resin | A | A | A | A | B |
| Flow rate of inert gas (L/min) | 50 | 50 | 50 | 50 | 50 |

TABLE 3-continued

| | First comparative example | Second comparative example | First example | Second example | Third example |
|---|---|---|---|---|---|
| Temperature of inert gas (° C.) | 25 | 25 | −50 | −50 | −100 |
| Light source | 395 nm LED | D-bulb | 395 nm LED | D-bulb | D-bulb |
| Amount of light (W/cm²) | 4.0 | 1.5 | 4.0 | 1.5 | 1.5 |
| Ratio between reaction rates 1000 km/50 km | 0.8 | 0.7 | 1.0 | 1.0 | 0.9 |
| Pull-out force (N) 1000 km | 3.1 | 2.8 | 5.5 | 7.4 | 8.2 |

The device configuration of the manufacturing facility 100 for an optical fiber wire according to the first embodiment was used for the evaluation tests. In Table 3, the linear speed in the test conditions is a speed at which the winder 160 winds the optical fiber wire; the flow rate of inert gas is a flow rate at which the first inert gas $G_{11}$ is injected into the first inert gas injecting tube 134; and the temperature of inert gas is a temperature of the first inert gas $G_{11}$.

The light source represents a type of the ultraviolet light source 132 in the primary ultraviolet radiation device 130. The 395-nm LED is a light source using a laser diode having an emission wavelength of 395 nm. The D-bulb is an ultraviolet light source having a light-emitting spectrum similar to that of a metal halide lamp. The amount of light represents the amount of light of the ultraviolet light source 132.

The following findings were obtained from comparison between the first and the second comparative examples and the first to the third examples.

The ratio between the reaction rates is 0.8 or 0.7 in the first comparative example and the second comparative example, and deterioration of the coating is found in the direction of the length of the optical fiber wire. On the other hand, the ratio between the reaction rates is either 1.0 or 0.9 in the first to the third examples, and the quality of the coating is stabilized in the direction of the length of the optical fiber wire.

The pull-out force is 3.1 N and 2.8 N in the first comparative example and the second comparative example, respectively, which are lower than 4 N. The pull-out force is over 5 N in all of the first to the third examples, and the optical fiber and the coating are tightly attached to each other with sufficient strength.

Embodiments of the present disclosure have been described in detail; however, it should be noted that the described embodiments are not intended to limit the present disclosure. Various modifications can be made based on the technical thoughts of the present disclosure. For example, the numerical values given in the above-described embodiments are examples only, and a different value can be used as necessary in application of the present disclosure.

The method of manufacturing an optical fiber wire according to the present disclosure exerts advantageous effects of stabilizing the quality of a coating in the longitudinal direction and allowing a long-time continuous operation.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber wire, the method comprising:
   a resin application step of applying ultraviolet curable resin onto an outer periphery of an optical fiber, the optical fiber being traveling;
   a first cooling step of causing the optical fiber to travel in an atmosphere of a first cooled inert gas to form an accompanying airflow of the first cooled inert gas in a vicinity of a surface of the ultraviolet curable resin to cool the ultraviolet curable-type resin;
   a second cooling step of injecting a second cooled gas into an ultraviolet transparent tube in an ultraviolet radiation device to further cool the ultraviolet curable resin;
   a first resin curing step of radiating, through the ultraviolet transparent tube, an ultraviolet ray on the ultraviolet curable resin, which has been cooled by the first cooled inert gas and the second cooled gas to cure the ultraviolet curable resin; and
   a first heating step of injecting a first room-temperature inert gas from an area, which is more separated from the optical fiber than an injection port of the second inert gas.

2. The method of manufacturing an optical fiber wire according to claim 1, the method further comprising:
   a second resin curing step of further curing, after the first resin curing step, the ultraviolet curable resin by radiating, through the ultraviolet transparent tube, an ultraviolet ray on the ultraviolet curable resin, wherein, the second resin curing step includes a second heating step of injecting a second room-temperature inert gas onto an outer periphery of the ultraviolet curable resin.

3. The method of manufacturing an optical fiber wire according to claim 1, wherein temperatures of the first cooled inert gas and the second cooled gas allow a reduction in a temperature of the ultraviolet curable resin to a one-percent thermal weight loss temperature.

4. The method of manufacturing an optical fiber wire according to claim 1, wherein temperatures of the first cooled inert gas and the second cooled gas allow a reduction in a temperature of the ultraviolet curable resin to a temperature lower than the one-percent thermal weight loss temperature by 15°C. or more.

5. The method of manufacturing an optical fiber wire according to claim 1, wherein the first cooled inert gas and the second cooled gas are nitrogen gas.

6. The method of manufacturing an optical fiber wire according to claim 1, wherein a speed at which the optical fiber passes inside an ultraviolet radiation device is equal to or greater than 850 m/min.

7. The method of manufacturing an optical fiber wire according to claim 1, wherein the first cooling step is performed on the ultraviolet curable resin prior to the ultraviolet curable resin entering the ultraviolet transparent tube.

8. The method of manufacturing an optical fiber wire according to claim 1, wherein the second cooling step comprises injecting second cooled gas into a fiber opening of the ultraviolet transparent tube.

* * * * *